US011938725B2

(12) United States Patent
Okushima

(10) Patent No.: US 11,938,725 B2
(45) Date of Patent: Mar. 26, 2024

(54) PRINTER, PRINTING METHOD, AND RECORDING MEDIUM

(71) Applicant: SCREEN HOLDINGS CO., LTD., Kyoto (JP)

(72) Inventor: Tomoyasu Okushima, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 216 days.

(21) Appl. No.: 17/587,472

(22) Filed: Jan. 28, 2022

(65) Prior Publication Data

US 2022/0305775 A1 Sep. 29, 2022

(30) Foreign Application Priority Data

Mar. 23, 2021 (JP) ................................ 2021-048222

(51) Int. Cl.
*B41J 2/045* (2006.01)

(52) U.S. Cl.
CPC ....... *B41J 2/04573* (2013.01); *B41J 2/04541* (2013.01); *B41J 2/04581* (2013.01); *B41J 2/04588* (2013.01)

(58) Field of Classification Search
CPC ................ B41J 2/04573; B41J 2/04541; B41J 2/04581; B41J 2/04588; B41J 2/04508
See application file for complete search history.

(56) References Cited

U.S. PATENT DOCUMENTS 6,357,846 B1 * 3/2002 Kitahara .............. B41J 2/04588 347/11
9,283,751 B2 * 3/2016 Yamagata ............ B41J 2/04503
9,387,672 B2 * 7/2016 Yamagata ............ B41J 2/04588
2015/0210073 A1 7/2015 Yamagata
2017/0001438 A1 1/2017 Seto et al.

FOREIGN PATENT DOCUMENTS

JP 2015-139915 A 8/2015
JP 2017-013391 A 1/2017

* cited by examiner

*Primary Examiner* — Sharon Polk
(74) *Attorney, Agent, or Firm* — Rimon P.C.

(57) ABSTRACT

The N candidate timings Tc (I) from the first one to the N-th one which are arranged in chronological order with an interval of the cycle Cs in accordance with the transport speed V of the printing medium WP are set. When the I-th candidate timing Tc (I) is set outside the prohibition interval Pw with the (I−1)th output timing Td (I−1) as the starting point timing, the I-th candidate timing Tc (I) is determined as the I-th output timing Td (I). On the other hand, when the I-th candidate timing Tc (I) is set within the prohibition interval Pw with the (I−1)th output timing Td (I−1) as the starting point timing, a timing after the prohibition interval Pw is determined as the I-th output timing Td (I).

5 Claims, 10 Drawing Sheets

PRINTER, PRINTING METHOD, AND RECORDING MEDIUM

CROSS REFERENCE TO RELATED APPLICATION

The disclosure of Japanese Patent Application No. 2021-048222 filed on Mar. 23, 2021 including specification, drawings and claims is incorporated herein by reference in its entirety.

BACKGROUND OF THE INVENTION

1. Field of the Invention

The present invention relates to an inkjet technology for ejecting ink from a nozzle communicating with a pressure chamber by giving pressure variation to the ink stored in the pressure chamber.

2. Description of the Related Art

A printer is well known, which prints an image on a printing medium by ejecting ink from a nozzle of an ejection head by an inkjet method while moving the printing medium relatively to the ejection head. In such a printer, the ink is ejected at a time interval in accordance with a relative speed of the printing medium to the ejection head. In other words, the ink can be accurately landed at a target position of the printing medium by reducing an ejection interval of the ink as the relative speed of the printing medium increases.

This ejection head has a pressure chamber storing ink therein and a nozzle communicating with the pressure chamber and gives pressure variation to the ink inside the pressure chamber by a driving element provided with respect to the pressure chamber, to thereby eject the ink from the nozzle. As Japanese Patent Application Laid Open Gazette No. 2017-013391 (Patent Document 1) points out, in such an ejection head, there occurs vibration in a meniscus of the ink formed in the nozzle as the ink is ejected and this vibration decays with the passage of time. In other words, until a predetermined decay time elapses from the ejection of the ink, there remains residual vibration in the meniscus of the ink.

When the ejection interval of the ink is longer than the decay time of the residual vibration, the residual vibration decays between one ink ejection and the next ink ejection. For this reason, the ink can be ejected from the nozzle without any effect of the residual vibration. On the other hand, when the ejection interval of the ink is shorter than the decay time of the residual vibration, the residual vibration does not decay between one ink ejection and the next ink ejection. For this reason, the residual vibration affects the pressure variation given to the ink inside the pressure chamber for the next ink ejection. As a result, sometimes the ejection speed of the ink from the nozzle significantly decreases and the position at which the ink is landed on the printing medium is largely deviated.

Then, in Patent Document 1, assuming that two cycles are regarded as one set, when the cycle (interval) of ejecting the ink corresponds to twice the cycle in which some effect of the residual vibration occurs, the effect of the residual vibration is suppressed by delaying a start timing of the second cycle. Further, in Japanese Patent Application Laid Open Gazette No. 2015-139915 (Patent Document 2), a plurality of kinds of ejection signals which give different output timings of the ink from one another are prepared, and by using these ejection signals separately, the effect of the residual vibration is suppressed.

SUMMARY OF THE INVENTION

As described above, Patent Document 1 requires the control for regarding two cycles as one set and Patent Document 2 requires the control for using a plurality of kinds of ejection signals separately. Such controls are not always easy or convenient, and therefore any different method for suppressing the effect of the residual vibration is required.

The present invention is intended to solve the above problem, and it is an object of the present invention to make it possible to suppress any effect of residual vibration when printing is performed by using an ejection head which gives pressure variation to ink inside a pressure chamber by a driving element and thereby ejects the ink from a nozzle.

A printer according to the invention comprises: an ejection head having a pressure chamber storing ink therein, a nozzle communicating with the pressure chamber, and a driving element giving pressure variation to the ink inside the pressure chamber; a driving part configured to move a printing medium facing the nozzle relatively to the ejection head; and a control part configured to determine N output timings from a first output timing to an N-th output timing which are arranged in chronological order and outputs an ejection signal to the driving element at each of the N output timings, N being an integer not smaller than 2, wherein the driving element gives the pressure variation to the ink inside the pressure chamber in response to the ejection signal received from the control part, to thereby eject the ink from the nozzle, the control part performs a timing determination operation in which N candidate timings from a first candidate timing to an N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

A printing method according to the invention is a printing method of ejecting ink to a printing medium from a nozzle of an ejection head having a pressure chamber storing ink therein, the nozzle communicating with the pressure chamber, and a driving element giving pressure variation to the ink inside the pressure chamber, comprising: determining N output timings from the first output timing to the N-th output timing which are arranged in chronological order, N being an integer not smaller than 2; and ejecting ink from the nozzle by outputting an ejection signal to the driving element at each of the N output timings so that the driving element gives pressure variation to the ink inside the pressure chamber in response to the ejection signal, while moving a printing medium facing the nozzle relatively to the ejection head, wherein in determining the output timings, performed is a timing determination operation in which N candidate timings from the first candidate timing to the N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

A printing program according to the invention causes a computer to control ejection of ink to a printing medium from a nozzle of an ejection head having a pressure chamber storing ink therein, the nozzle communicating with the pressure chamber, and a driving element giving pressure variation to the ink inside the pressure chamber, and causes the computer to perform: determining N output timings from the first output timing to the N-th output timing which are arranged in chronological order, N being an integer not smaller than 2; and ejecting ink from the nozzle by outputting an ejection signal to the driving element at each of the N output timings so that the driving element gives pressure variation to the ink inside the pressure chamber in response to the ejection signal, while moving a printing medium facing the nozzle relatively to the ejection head, wherein in determining the output timings, performed is a timing determination operation in which N candidate timings from the first candidate timing to the N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

A recording medium according to the invention records the above printing program in a computer-readable manner.

In the present invention (the printer, the printing method, the printing program, and the recording medium) having such a configuration, the N output timings from the first output timing to the N-th output timing which are arranged in chronological order are determined. In more detail, set are the N candidate timings from the first candidate timing to the N-th candidate timing which are arranged in chronological order at a time interval in accordance with the relative speed of the printing medium to the ejection head. Then, the N output timings are determined on the basis of the prohibition interval provided to a predetermined range at which a predetermined time elapses from the starting point timing and the N candidate timings (timing determination operation). In this timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, the computation to determine so that a timing after the prohibition interval is the I-th output timing is performed for the second and later candidate timings in chronological order. In other words, when the I-th candidate timing is inside the prohibition interval and corresponds to a timing on which the effect of the residual vibration is produced, the timing after the prohibition interval is determined as the I-th output timing. It is thereby possible to determine the N output timings to timings where the effect of the residual vibration is suppressed. Thus, it is possible to suppress the effect of the residual vibration when printing is performed by using the ejection head which uses the driving element to give pressure variation to the ink inside the pressure chamber and thereby ejects the ink from the nozzle.

Thus, according to the present invention, it becomes possible to suppress the effect of the residual vibration when printing is performed by using the ejection head which uses the driving element to give pressure variation to the ink inside the pressure chamber and thereby ejects the ink from the nozzle.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
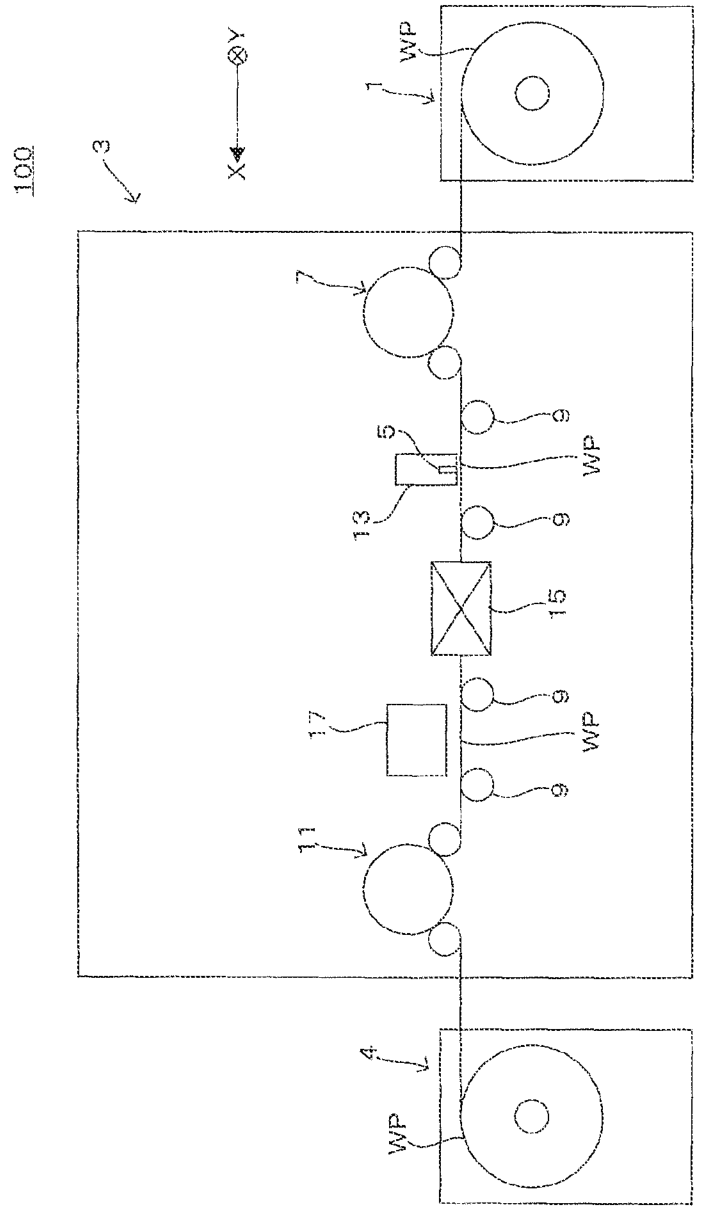
FIG. 1 is a front view schematically showing a printing system equipped with one example of a printer in accordance with the present invention.

FIG. 1 is a front view schematically showing a printing system 100 equipped with one example of a printer in accordance with the present invention. In FIG. 1 and the following figures, for clarifying an arrangement relation of constituent elements of the apparatus, an X direction which is a horizontal direction in which a paper feed part 1, a printer 3, and a paper output part 4 included in the printing system 100 are arranged and a Y direction which is a horizontal direction orthogonal to the X direction are shown as appropriate.

The printing system 100 of the present embodiment includes the paper feed part 1, the printer 3, and the paper output part 4. The paper feed part 1 holds roll-type continuous form paper WP rotatably about a horizontal axis. The paper feed part 1 supplies the printer 3 with a printing medium WP which is continuous form paper while unwinding the printing medium WP. The printer 3 ejects ink to the printing medium WP to form an image, to thereby perform printing and sends out the printing medium WP to the paper output part 4. The paper output part 4 winds the printing medium WP on which printing is performed by the printer 3 around the horizontal axis.

Herein, a direction in which the printing medium WP which is continuous form paper is sent out by the paper feed part 1 and transported is referred to as a transport direction X. Further, a horizontal direction orthogonal to the transport direction X is referred to as a width direction Y. The above-described paper feed part 1 is disposed on the upstream side of the printer 3 in the transport direction X. The above-described paper output part 4 is disposed on the downstream side of the printer 3 in the transport direction X.

Further, the above-described printing medium WP which is continuous form paper corresponds to a "printing medium" of the present invention.

The printer 3 includes a driving roller 7 taking in the printing medium WP from the paper feed part 1 in the upstream side thereof. The printing medium WP taken in from the paper feed part 1 by the driving roller 7 is sent out by a plurality of transport rollers 9 in the transport direction X and transported toward the paper output part 4 on the downstream side thereof. A driving roller 11 is disposed between the transport roller 9 positioned on the most downstream side and the paper output part 4. This driving roller 11 sends out the printing medium WP being transported on the transport rollers 9 toward the paper output part 4.

The printer 3 includes a printing part 13, a drying part 15, and a line scanner 17 between the driving roller 7 and the driving roller 11 in this order from the upstream side along the transport direction X. The printing part 13 performs printing on the printing medium WP. The drying part 15 dries the printing medium WP on which printing is performed by the printing part 13. The line scanner 17 inspects whether or not there is any stain, dropout, or the like in a printed portion of the printing medium WP.

The printing part 13 includes an ejection head 5 having a plurality of nozzles ejecting ink to the printing medium WP. Generally, a plurality of printing parts 13 are disposed along the transport direction X of the printing medium WP. For example, the printer 3 includes four printing parts 13 in total for black (K), cyan (C), magenta (M), and yellow (Y). In the following description, however, taken is an exemplary configuration in which the printer 3 includes only one printing part 13. Further, the printing part 13 has a length larger than the width of the printing medium WP in the width direction Y of the printing medium WP. The printing part 13 includes the ejection heads 5 enough to perform printing on a printing area in the width direction of the printing medium WP without moving in the width direction Y.

Figure 2:
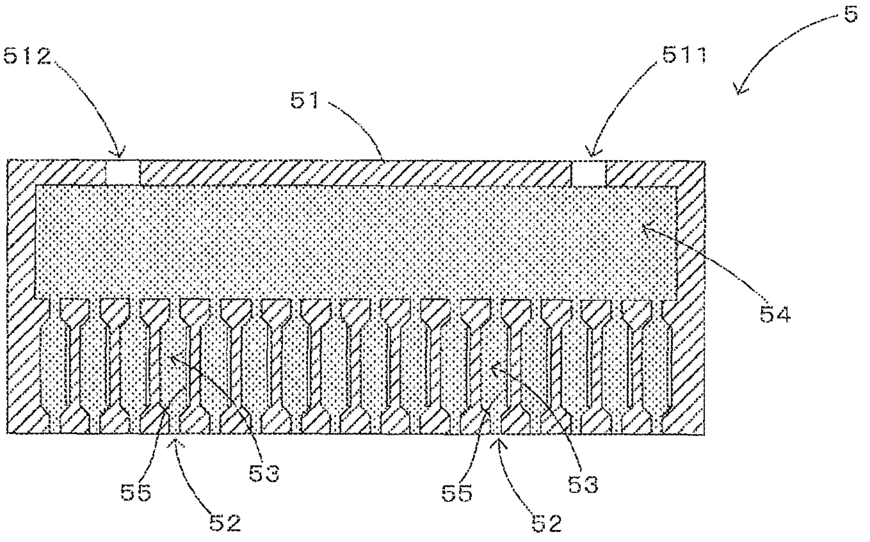
FIG. 2 is a partial cross section schematically showing a configuration of an ejection head.

FIG. 2 is a partial cross section schematically showing a configuration of the ejection head. As described above, the printing part 13 has the plurality of ejection heads 5, and each of the ejection heads 5 ejects ink by an inkjet method. As shown in FIG. 2, the ejection head 5 has a housing 51 and a plurality of nozzles 52 arranged in a predetermined direction on the bottom of the housing 51, and each of the plurality of nozzles 52 opens downward. Inside the housing 51, provided are a plurality of cavities 53 communicating with the plurality of nozzles 52, respectively, and an ink feed chamber 54 communicating with the plurality of cavities 53. Further, the housing 51 has an inflow port 511 and an outflow port 512 which are opened and communicate with the ink feed chamber 54. The ink supplied to the ink feed chamber 54 from the inflow port 511 is collected from the outflow port 512 by a not-shown ink circulation mechanism, so that the ink is circularly supplied to the ink feed chamber 54. The ink is supplied from the ink feed chamber 54 to each of the cavities 53.

A piezoelectric element 55 is provided for each of the plurality of cavities 53. The piezoelectric element 55 is, for example, a piezo element, which is deformed in response to an applied electrical signal. Then, in response to the deformation of the piezoelectric element 55, the pressure of the ink inside the cavity 53 varies. As described later, an ejection signal which is electrical signal is applied to this piezoelectric element 55. When the ejection signal is applied to the piezoelectric element 55, the piezoelectric element 55 gives pressure variation (ejection pressure variation) required to eject the ink from the nozzle 52 to the ink inside the cavity 53.

Figure 3:
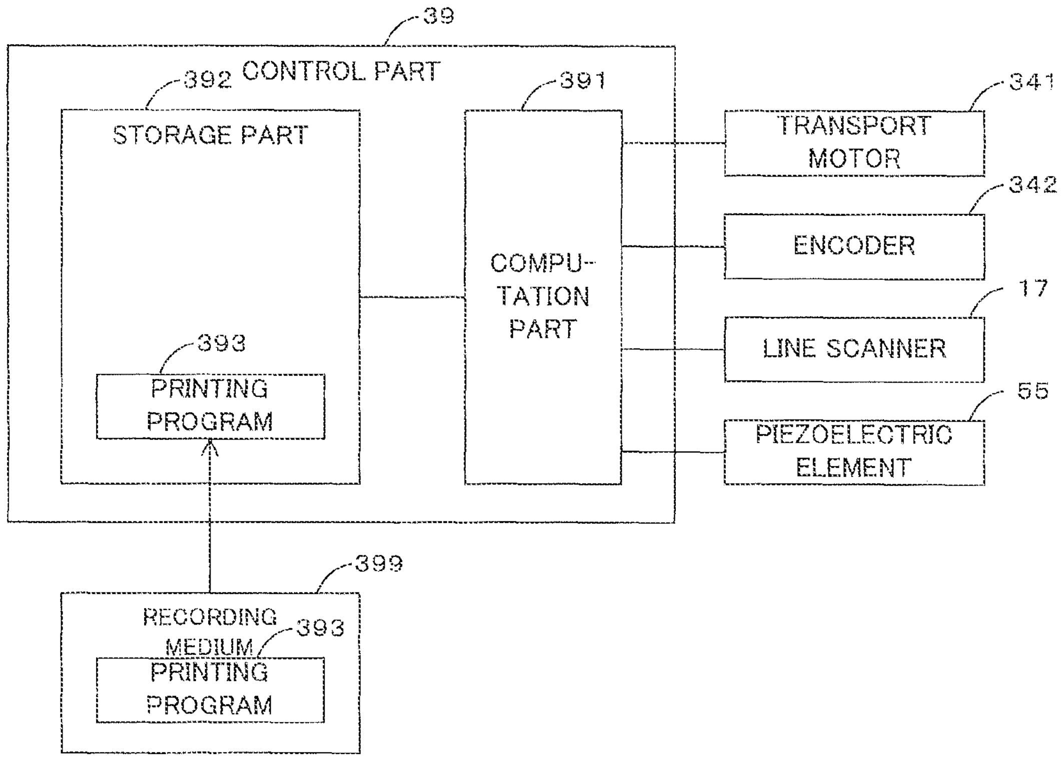
FIG. 3 is a block diagram showing an electrical configuration included in the printer of FIG. 1.

FIG. 3 is a block diagram showing an electrical configuration included in the printer 3 of FIG. 1. As shown in FIG. 3, the printer 3 includes a transport motor 341 driving the driving roller 7 to transport the printing medium WP and an encoder 342 detecting a rotation position of the transport motor 341 (in other words, a transport position of the printing medium WP). The transport motor 341 is a servo motor for rotating the driving roller 7. Further, the printer 3 includes a line scanner 17 (line camera). This line scanner 17 is disposed perpendicular to the transport direction of the printing medium WP and for example, captures an image printed on a recording surface of the printing medium WP passing an image capturing position between the drying part 15 and the paper output part 4 on the downstream side of the printing part 13.

Further, the printer 3 includes a control part 39 generally controlling the whole apparatus. This control part 39 has a computation part 391 which is a processor such as a CPU (Central Processing Unit) or the like and a storage part 392 which is a memory device such as an HDD (Hard Disk Drive), an SSD (Solid State Drive), or the like. The computation part 391 controls the transport motor 341, the encoder 342, the line scanner 17, and the piezoelectric element 55, and the storage part 392 stores therein a printing program 393 to be executed by the computation part 391. This printing program 393 is, for example, provided by a recording medium 399 which is provided separately from the control part 39. This recording medium 399 records therein the printing program 393 so as to be read by a computer (the control part 39). As such a recording medium 399, for example, a USB (Universal Serial Bus) memory, a memory card, a memory device of an external server computer, or the like can be used. Then, the printing program 393 defines contents of the control to be executed by the control part 39. Subsequently, the control to be executed by the computation part 391 in accordance with the printing program 393 will be described.

Figure 4:
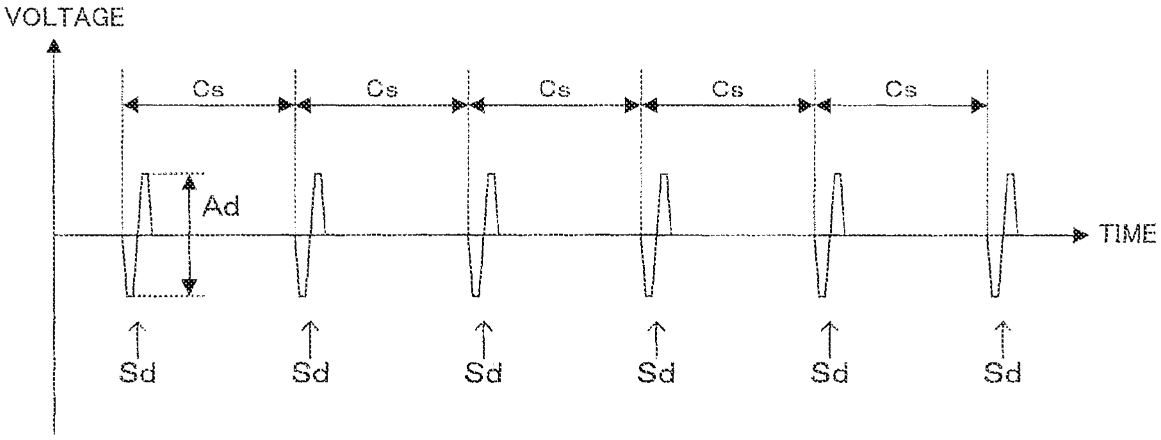
FIG. 4 is a view schematically showing a waveform of an ejection signal outputted to a piezoelectric element of the ejection head.

FIG. 4 is a view schematically showing a waveform of the ejection signal outputted to the piezoelectric element of the ejection head. In FIG. 4, the horizontal axis represents the time, and the vertical axis represents the voltage. As shown in FIG. 4, the ejection signal Sd is a voltage signal having an amplitude Ad, whose voltage is changed with the passage of time, and when the computation part 391 outputs the ejection signal Sd to the piezoelectric element 55, the piezoelectric element 55 varies the pressure to be given to the ink inside the cavity 53 in response to the change of the voltage indicated by the ejection signal Sd. With this pressure variation, the ink is ejected from the nozzle 52 communicating with the cavity 53. Such an ejection signal Sd is periodically outputted in accordance with a transport speed of the printing medium WP.

In more detail, the computation part 391 calculates a speed at which the printing medium WP is transported, on the basis of the transport position of the printing medium WP which is detected by the encoder 342. The computation part 391 determines a cycle Cs (in other words, a time interval) in which the ejection signal Sd is outputted to the piezoelectric element 55, on the basis of the transport speed of the printing medium WP which is thus calculated. In other words, in order to land the ink on the printing medium WP with a constant resolution regardless of the transport speed of the printing medium WP, it is necessary to adjust the cycle Cs in which the ejection signal Sd is outputted in accordance with the transport speed of the printing medium WP. Specifically, the computation part 391 reduces the cycle Cs of the ejection signal Sd as the transport speed of the printing medium WP increases, and the computation part 391 increases the cycle Cs of the ejection signal Sd as the transport speed of the printing medium WP decreases. In other words, the cycle Cs is in inverse proportion to the transport speed V.

Figure 5:
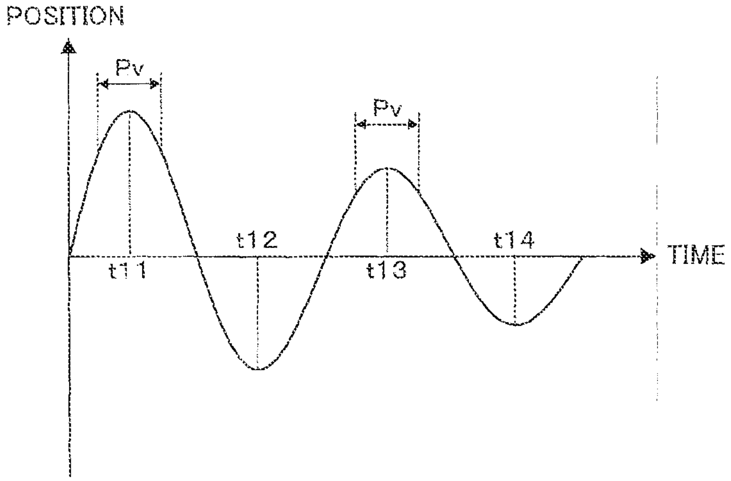
FIG. 5 is a view schematically showing residual vibration which occurs as ink is outputted in response to the ejection signal.

FIG. 5 is a view schematically showing the residual vibration which occurs as the ink is outputted in response to the ejection signal. In FIG. 5, the horizontal axis represents the time, and the vertical axis represents the meniscus pressure. When the ink is ejected from the nozzle 52, there occurs vibration in a meniscus of the ink formed in the nozzle 52. The residual vibration of the meniscus, which occurs as the ink is ejected, decays with the passage of time. For this reason, when the cycle Cs of the ejection signal Sd is longer than a decay time of the residual vibration, no effect of the residual vibration of the meniscus is produced on the ejection of the ink in response to the ejection signal Sd. On the other hand, when the cycle Cs of the ejection signal Sd is shorter than the decay time of the residual vibration of the meniscus, the ink is ejected in response to the ejection signal Sd in a state where there is vibration in the meniscus. For this reason, sometimes an ejection speed of the ink significantly decreases and a landing position of the ink on the printing medium WP is largely deviated.

The effect of the residual vibration of the meniscus to be produced on the ejection of the ink depends on a relation between a phase of the residual vibration of the meniscus and an ejection timing of the ink. Herein, considered is a case where the ejection speed of the ink significantly decreases when the ejection timing of the ink in response to the ejection signal Sd coincides with or approximates to a peak (the time t11, t13) on one side of the residual vibration. In this case, if the ejection timing of the ink in response to the ejection signal Sd, for example, coincides with or approximates to a peak (the time t12, t14) on the other side of the residual vibration, which has a phase opposite to that of the peak on one side thereof, the effect of the residual vibration produced on the ejection of the ink is very small. In other words, when the ejection timing of the ink is included in a predetermined residual vibration effect period Pv including the peak on one side of the residual vibration, the residual vibration affects the ejection of the ink, and when the ejection timing of the ink is outside the residual vibration effect period Pv, the effect of the residual vibration to be produced on the ejection of the ink is negligible. On the other hand, the cycle Cs (i.e., the ejection timing) for ejecting the ink varies according to the transport speed of the printing medium WP. Therefore, whether the effect of the residual vibration of the meniscus is significant or negligible depends on the transport speed of the printing medium WP.

Figure 6:
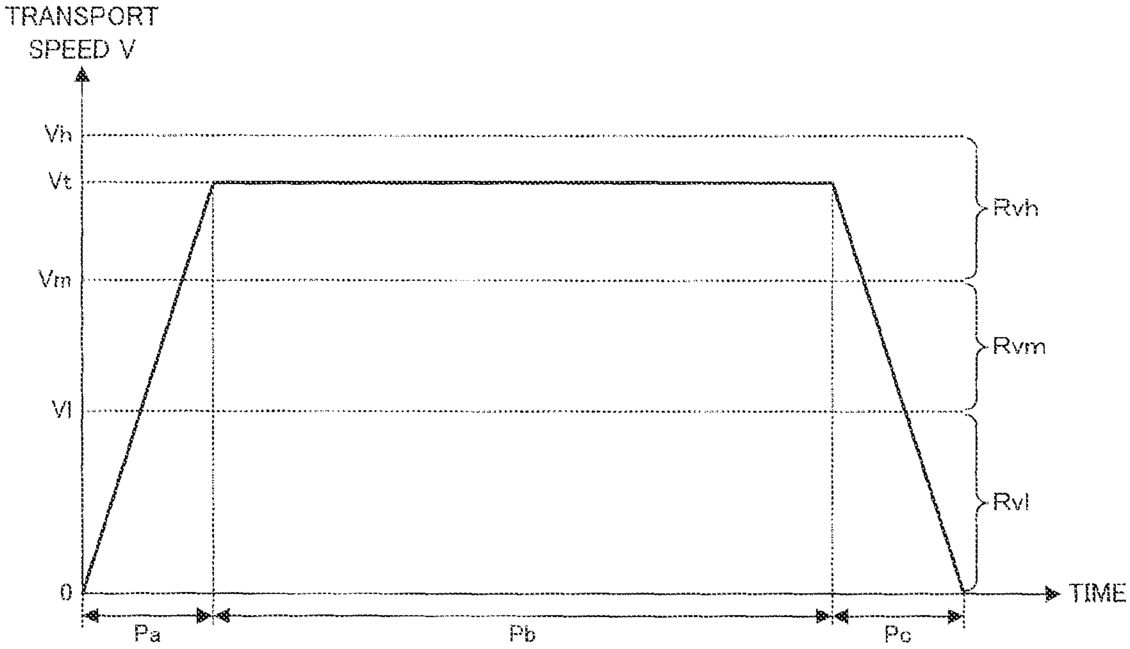
FIG. 6 is a view schematically showing one example of time variation in the transport speed of a printing medium.

FIG. 6 is a view schematically showing one example of time variation in the transport speed of the printing medium. In FIG. 6, the horizontal axis represents the time, and the vertical axis represents the transport speed V of the printing medium WP. In the exemplary case of this figure, in an acceleration period Pa, the transport speed V of the printing medium WP increases from zero to a predetermined steady speed Vt. In a steady period Pb subsequent to the acceleration period Pa, the transport speed V of the printing medium WP is constant at the steady speed Vt. Further, in a deceleration period Pc subsequent to the steady period Pb, the transport speed V of the printing medium WP decreases from the steady speed Vt to zero.

As described above, the output cycle Cs of the ejection signal Sd is set shorter as the transport speed V is higher and set longer as the transport speed V is lower. Therefore, in response to the variation in the transport speed V shown in FIG. 6, the output cycle Cs of the ejection signal Sd varies. As a result, in a case where the printing medium WP is transported at the transport speed V in a low speed range Rvl from the speed of zero to a speed Vl, the ejection timing of the ink in response to the ejection signal Sd is outside the residual vibration effect period Pv. Further, in another case where the printing medium WP is transported at the transport speed V in a medium speed range Rvm from the speed Vl to a speed Vm higher than the speed Vl, the ejection timing of the ink in response to the ejection signal Sd overlaps the residual vibration effect period Pv. Furthermore, in still another case where the printing medium WP is transported at the transport speed V in a high speed range Rvh from the speed Vm to a speed Vh higher than the speed Vm, the ejection timing of the ink in response to the ejection signal Sd is outside the residual vibration effect period Pv. Further, in these cases, the steady speed Vt is higher than the speed Vm and lower than the speed Vh.

Then, depending on which one of the low speed range Rvl, the medium speed range Rvm, and the high speed range Rvh the transport speed V is included in, different controls are performed. Specifically, in the cases where the printing medium WP is transported at the transport speed V in the low speed range Rvl or the high speed range Rvh, as shown in FIG. 4, a plurality of ejection signals Sd are outputted to the piezoelectric element 55 in the cycle Cs corresponding to the transport speed V and the printing is thereby performed. On the other hand, in the case where the printing medium WP is transported at the transport speed in the medium speed range Rvm, an image is printed on the printing medium WP while changing an output interval of the ejection signal Sd to the piezoelectric element 55 from the cycle Cs in accordance with the transport speed V as appropriate. Such a printing method will be described with reference to FIGS. 7 and 8.

Figure 7:
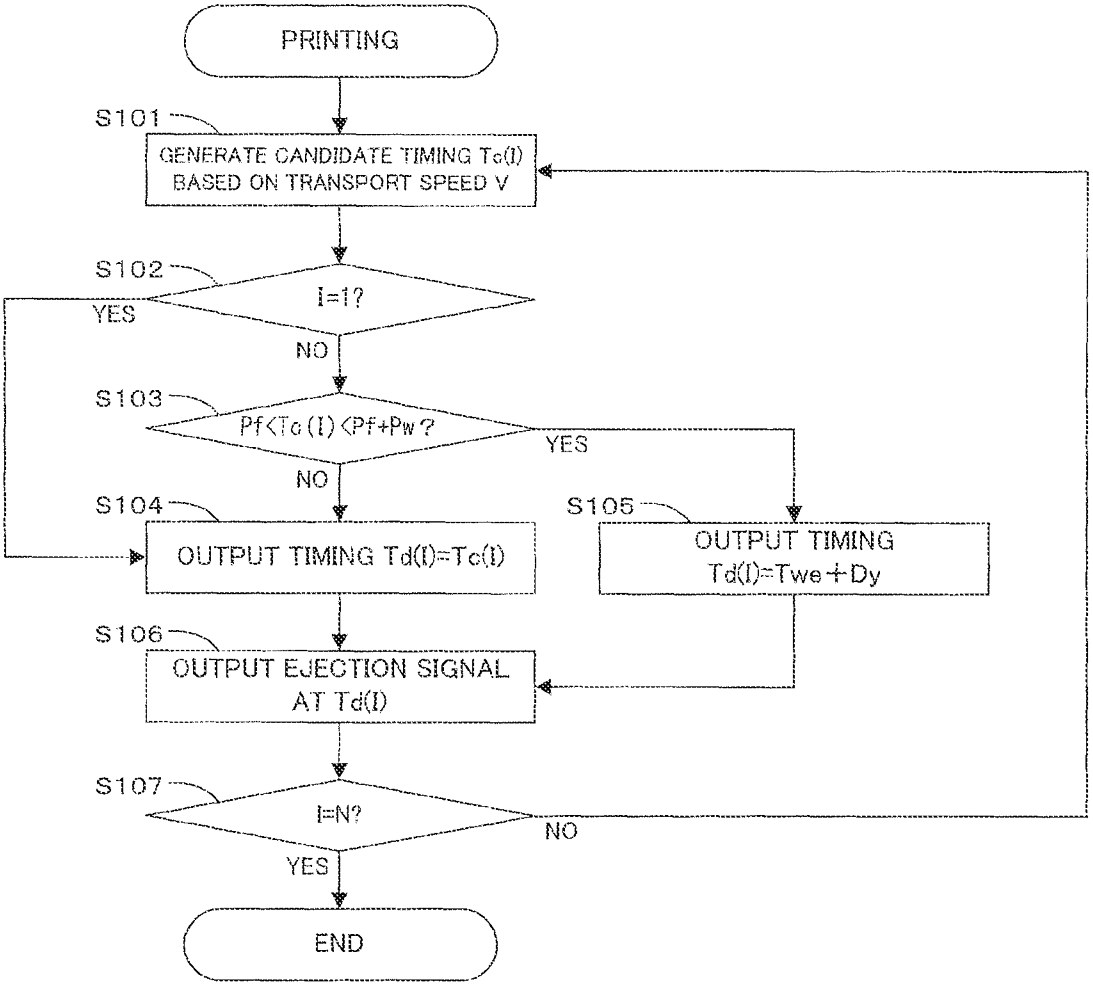
FIG. 7 is a flowchart showing one example of a printing method performed while adjusting the cycle in which the ejection signal is outputted.
Figure 8:
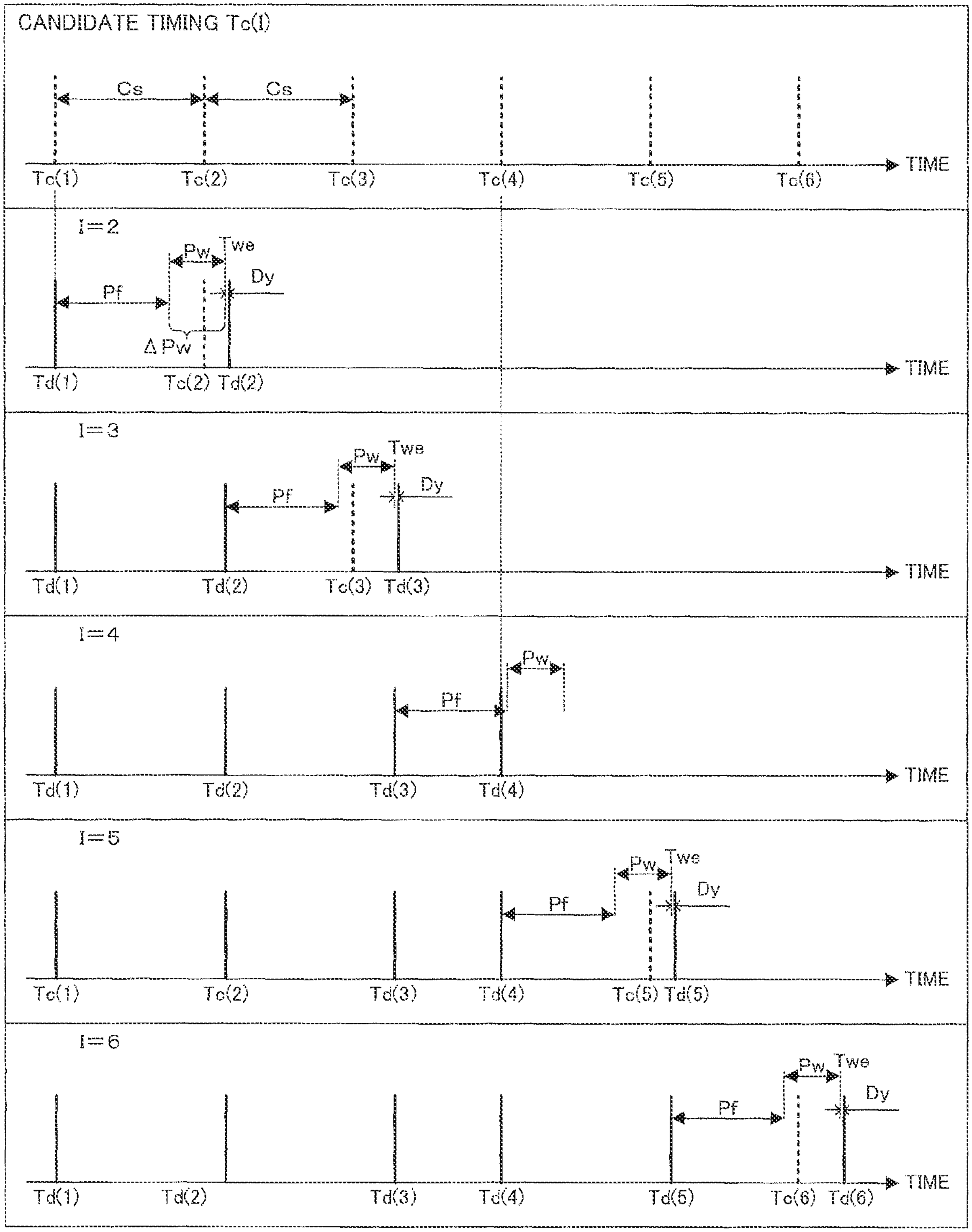
FIG. 8 is a view schematically showing one example of an operation performed in accordance with the flowchart of FIG. 7.

FIG. 7 is a flowchart showing one example of the printing method performed while adjusting the cycle in which the ejection signal is outputted, and FIG. 8 is a view schematically showing one example of an operation performed in accordance with the flowchart of FIG. 7. As described above, the time chart of FIG. 8 is executed in the case where the printing medium WP is transported at the transport speed V in the medium speed range Rvm.

In Step S101, a candidate timing Tc (I) which is a candidate of the timing for outputting the ejection signal Sd is generated on the basis of the transport speed V. Specifically, the transport speed V of the printing medium WP is obtained from the transport position of the printing medium WP which is indicated by the encoder 342. Then, as described above with reference to FIG. 4, the candidate timing Tc (I) is repeatedly generated in the cycle Cs (time interval) in accordance with the transport speed V. Herein, I is an integer not smaller than 1, indicating the order of the candidate timing Tc. In this Step S101, first, the candidate timing Tc (1) is generated (I=1).

In Step S102, it is determined whether or not the candidate timing Tc (I) generated in Step S101 is the first candidate timing Tc (1), i.e., the candidate timing Tc (1) which is first generated. Herein, since the candidate timing Tc (I) is the first one (I=1), it is determined "YES" in Step S102. Therefore, the candidate timing Tc (1) is set to an output timing Td (1) (Step S104), and the ejection signal Sd is outputted to the piezoelectric element 55 at the output timing Td (1) and the ink is ejected from the nozzle 52 (Step S106).

In Step S107, it is determined whether or not the candidate timing Tc (I) is the N-th candidate timing Tc (N), i.e., the last candidate timing Tc (N). Specifically, N is an integer not smaller than 2, indicating the number of ejection signals Sd required for the printing of the image (in other words, the number of ejections of the ink), and if the printing of the image requires 1000 times ejections of the ink, for example, N=1000. Herein, since the candidate timing Tc (1) is not the candidate timing Tc (N) (1<N), it is determined "NO" in Step S107 and the process goes back to Step S101.

In Step S101, a candidate timing Tc (2) indicating the time at which the cycle Cs elapsed from the candidate timing Tc (1) is generated. Specifically, in Step S101, in a state where I is not smaller than 2, the candidate timing Tc (I) indicating the time at which the cycle Cs elapsed from the candidate timing Tc (I−1) is generated. In Step S102, since the candidate timing Tc (2) is not the first candidate timing Tc (1), it is determined "NO" and the process goes to Step S103.

In Step S103, it is determined whether or not the candidate timing Tc (2) is included in a prohibition interval Pw. Specifically, for the candidate timing Tc (I), the prohibition interval Pw is set to a predetermined range ΔPw at which a predetermined elapsed time Pf elapses from the output timing Td (I−1) as a starting point. The prohibition interval Pw refers to an interval in which the effect of the residual vibration is produced, and is set corresponding to the above-described residual vibration effect period Pv. The prohibition interval Pw and the elapsed time Pf are obtained in advance theoretically or experimentally and stored in the storage part 392. As shown in a field of "I=2" in FIG. 8, the candidate timing Tc (2) is included in the prohibition interval Pw at which the elapsed time Pf elapses from the output timing Td (1). For this reason, it is determined "YES" in Step S103 and the process goes to Step S105.

In Step S105, a timing delayed by a delay time Dy from an end timing Twe of the prohibition interval Pw set for the candidate timing Tc (I) is set to the output timing Td (I). Thus, the output timing Td (I) is set after the prohibition interval Pw. As a result, as shown in a field of "I=2" in FIG. 8, the output timing Td (2) is set. Then, the ejection signal Sd is outputted to the piezoelectric element 55 at the output timing Td (2) and the ink is ejected from the nozzle 52 (Step S106).

In subsequent Step S107, since I<N, it is determined "NO" and the process goes back to Step S101. In Step S101, a candidate timing Tc (3) indicating the time at which the cycle Cs elapses from the candidate timing Tc (2) is generated. Then, in Step S102, since I is not 1, it is determined "NO" and the process goes to Step S103.

In Step S103, it is determined whether or not the candidate timing Tc (3) is included in the prohibition interval Pw. As shown in a field of "I=3" in FIG. 8, the candidate timing Tc (3) is included in the prohibition interval Pw at which the elapsed time Pf elapses from the output timing Td (2). For this reason, in Step S105, a timing delayed by the delay time Dy from the end timing Twe of the prohibition interval Pw set for the candidate timing Tc (3) is set to the output timing Td (3). Then, the ejection signal Sd is outputted to the piezoelectric element 55 at the output timing Td (3) and the ink is ejected from the nozzle 52 (Step S106).

In subsequent Step S107, since I<N, it is determined "NO" and the process goes back to Step S101. In Step S101, a candidate timing Tc (4) indicating the time at which the cycle Cs elapses from the candidate timing Tc (3) is generated. Then, in Step S102, since I is not 1, it is determined "NO" and the process goes to Step S103.

In Step S103, it is determined whether or not the candidate timing Tc (4) is included in the prohibition interval Pw. As shown in a field of "I=4" in FIG. 8, the candidate timing Tc (4) is outside the prohibition interval Pw at which the elapsed time Pf elapses from the output timing Td (3). Therefore, the candidate timing Tc (4) is set to an output timing Td (4) (Step S104), and the ejection signal Sd is outputted to the piezoelectric element 55 at the output timing Td (4) and the ink is ejected from the nozzle 52 (Step S106).

The operations of Steps S101 to S106 are repeated until it is determined that I=N in Step S107. Then, when it is determined that I=N ("YES") in Step S107, the flowchart of FIG. 7 is finished.

In the embodiment described above, the N output timings Td (I) (I=1, 2, . . . , N) from the first one to the N-th one which are arranged in chronological order are determined (Steps S104 and S105). In more detail, the N candidate timings Tc (I) from the first one to the N-th one which are arranged in chronological order with an interval of the cycle Cs (time interval) in accordance with the transport speed V of the printing medium WP are set (Step S101). Then, in Steps S103 to S105, the N output timings Td (I) are determined on the basis of the prohibition interval Pw provided to the predetermined range ΔPw at which the elapsed time Pf elapses from a starting point timing and the N candidate timings Tc (I) (timing determination operation). In this timing determination operation (Steps S103 to S105), when the I-th candidate timing Tc (I) is set outside the prohibition interval Pw with the (I−1)th output timing Td (I−1) as the starting point timing, the I-th candidate timing Tc (I) is determined as the I-th output timing Td (I) (Step S104). On the other hand, when the I-th candidate timing Tc (I) is set within the prohibition interval Pw with the (I−1)th output timing Td (I−1) as the starting point timing, a timing after the prohibition interval Pw is determined as the I-th output timing Td (I) (Step S105). Such a computation (Steps S103 to S105) is performed for the second and later candidate timings Tc (I) in chronological order. Specifically, when the I-th candidate timing Tc (I) is within the prohibition interval Pw and corresponds to a timing when the effect of the residual vibration is produced, the timing after this prohibition interval Pw is determined as the I-th output timing Td (I). It is thereby possible to determine the N output timings Td (I) to the timings when the effect of the residual vibration is suppressed. Thus, it becomes possible to suppress the effect of the residual vibration when the printing is performed by using the ejection head 5 which gives pressure variation to ink inside the cavity 53 (pressure chamber) by the piezoelectric element 55 (driving element) and thereby ejects the ink from the nozzle 52.

When the candidate timing Tc (I) is included in the prohibition interval Pw, the output timing Td (I) is set after the prohibition interval Pw. Subsequently, one example of this setting method will be described.

Figure 9:
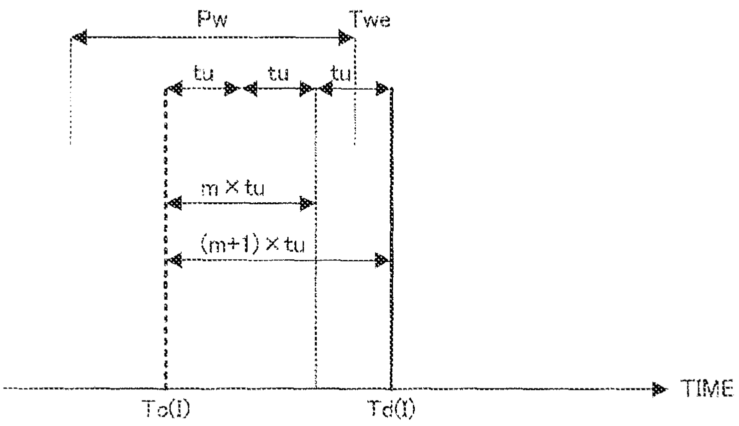
FIG. 9 is a view schematically showing one example of a setting method of an output timing in a case where a candidate timing is included in a prohibition interval.

FIG. 9 is a view schematically showing one example of the setting method of the output timing in a case where the candidate timing is included in the prohibition interval. In this setting method, setting of the output timing Td (I) is performed on the basis of a predetermined unit time tu. This unit time tu is set to a value obtained by dividing the cycle Cs of the candidate timing Tc by K. Herein, K is an integer not smaller than 2, and for example, "32". Then, when the candidate timing Tc (I) is included in the prohibition interval Pw with the output timing Td (I−1) as the starting point timing, a timing which is delayed step by step by the unit time tu from the candidate timing Tc (I) and first gets out of the prohibition interval Pw, i.e., a timing after the end timing Twe is determined as the output timing Td (I).

Specifically, assuming that a time interval obtained by dividing the time interval (cycle Cs) between the (I−1)th candidate timing Tc (I−1) and the I-th candidate timing Tc (I) by K is the unit time tu, a timing when the prohibition interval Pw is ended is the end timing Twe, and "m" is an integer not smaller than 0, satisfying the following inequality, $$m \times tu + Tc(I) < Twe < (m+1) \times tu + Tc \quad (I)$$

The I-th output timing Td (I) is expressed by the following equation:

$$Td(I) = (m+1) \times tu + Tc \quad (I)$$

In such a setting method, assuming that a value obtained by dividing the cycle Cs (time interval) between the (I−1)th candidate timing Tc (I−1) and the I-th candidate timing Tc (I) by K is regarded as the unit time tu, the computation part 391 determines a timing which is delayed step by step by the unit time tu from the I-th candidate timing Tc (I) and first gets out of the prohibition interval, as the I-th output timing Td (I). In such a configuration, by an easy and convenient computation in which the timing is shifted by the unit time tu, it is possible to determine the output timings Td (I) to the timings where the effect of the residual vibration is suppressed.

In the printing method of FIGS. 7 and 8, an image is printed while adjusting the ejection timing of the ink by delaying the output timing Td (I) of the ejection signal Sd as appropriate (ejection timing adjusted printing). Especially, the ejection timing adjusted printing is performed only when the transport speed V of the printing medium WP is included in the medium speed range Rvm. Subsequently, one example of a method of determining a target speed range (medium speed range Rvm) which is a target for the ejection timing adjusted printing will be described.

Figure 10:
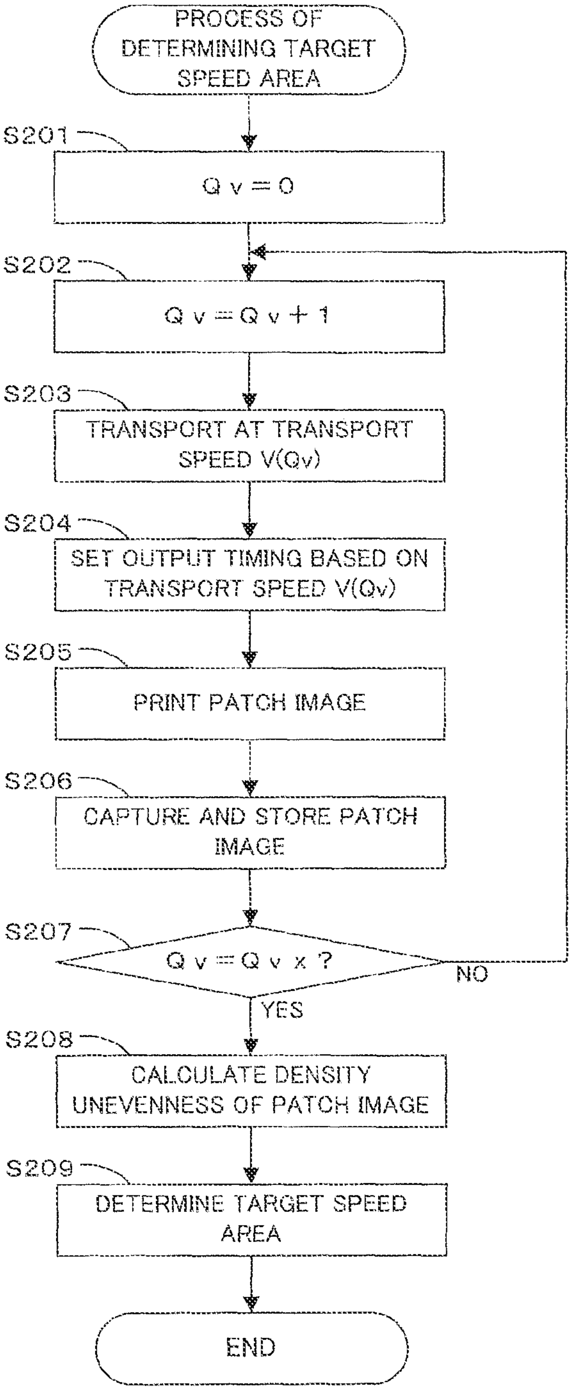
FIG. 10 is a flowchart showing one example of a process of determining a target speed range in which ejection timing adjusted printing is performed.

FIG. 10 is a flowchart showing one example of a process of determining the target speed range in which the ejection timing adjusted printing is performed. In the flowchart of FIG. 10, the medium speed range Rvm shown in FIG. 6 is determined. In Step S201, Qv for distinguishing the transport speed V is reset to zero, and in Step S202, Qv is incremented by 1. In this exemplary case, the transport speed V is higher as the value of Qv is larger. Then, in Step S203, the printing medium WP is transported at the transport speed V (Qv). Further, in Step S204, the cycle Cs in which the ejection signal Sd is outputted is set in accordance with the transport speed V (Qv).

In Step S205, a patch image is printed on the printing medium WP which is transported at the constant transport speed V (Qv). In this Step S205, the computation part 391 outputs the ejection signal Sd to the piezoelectric element 55 in the cycle Cs depending on the transport speed V without performing the control (adjustment of the output timing Td (I)) shown in FIGS. 7 and 8, to thereby print the patch image. Thus, the patch image is printed by using the ink ejected from the nozzle 52 in response to each ejection signal Sd. Further, as described above, the printing part 13 has the plurality of ejection heads 5. The ejection heads 5 provided in the printer 3 have the common configuration. Therefore, the printing of the patch image may be performed by using one ejection head 5.

The patch image which is thus printed on the printing medium WP is moved toward the image capturing position of the line scanner 17 as the printing medium WP is transported. Then, the line scanner 17 acquires a captured image IM (Qv) by capturing the patch image which reaches the image capturing position, and stores the captured image IM(Qv) into the storage part 392 (Step S206).

In Step S207, it is determined whether or not Qv coincides with Qvx. When Qv does not coincide with Qvx ("NO" in Step S207), Qv is incremented by 1 in Step S202 and the transport speed V (Qv) increases by one level. In Step S203, the printing medium WP is transported at the transport speed V (Qv), and in Step S204, the output timing of the ejection signal Sd in accordance with the transport speed V (Qv) is set. Then, printing, capturing, and storage of the patch image are performed (Steps S205 to S206).

Thus, by repeating Steps S203 to S206 while increasing the transport speed V (Qv), acquired are the captured images IM (Qv) of the patch image printed on the printing medium WP while the printing medium WP is transported at the transport speeds V which are different from one another. Then, when it is determined that Qv coincides with Qvx ("YES") in Step S207, the computation part 391 analyzes the captured images IM (Qv) (Steps S208 and S209).

In more detail, in Step S208, calculated is density unevenness of each of a plurality of captured images IM (Qv) (Qv=1, 2, . . . , Qvx) representing the patch images printed on the printing medium WP transported at the transport speeds V which are different from one another. In Step S209, the medium speed range Rvm (target speed range) is determined on the basis of this density unevenness. Specifically, a captured image IM (Qv) having density unevenness larger than a predetermined threshold value is specified. In a state where the effect of the residual vibration is produced, the ejection of the ink is not stable and large density unevenness thereby occurs in the printed patch image. In other words, the captured image IM (Qv) indicating large density unevenness is formed of inks ejected while being affected by the residual vibration. Therefore, the medium speed range Rvm (target speed range) can be specified on the basis of the transport speed V of the printing medium WP at the time when this captured image IM (Qv) is printed. Further, as the medium speed range Rvm is specified, a speed range lower than the medium speed range Rvm is specified as the low speed range Rvl and a speed range higher than the medium speed range Rvm is specified as the high speed range Rvh.

Further, various methods of calculating the density unevenness may be used. There may be a method, for example, where the captured image IM (Qv) is divided into a plurality of very small areas and the dispersion or the standard deviation of the density of each of the plurality of very small areas may be calculated as the density unevenness.

Thus, in a target speed range determination process shown in FIG. 10, the computation part 391 performs a test printing operation (Steps S202 to S205) for printing the patch image (test image) on the printing medium WP by using the ink ejected from the nozzle 52 of the ejection head 5 and a condition determination operation (Steps S206 to S209) for determining the condition (medium speed range Rvm) on which the ejection timing adjusted printing is performed, on the basis of a result of capturing the patch image by using the line scanner 17 (detection part). It is thereby possible to optimize the condition (medium speed range Rvm) for performing the ejection timing adjusted printing.

Especially in Steps S202 to S205, in a state where adjustment of the output timing is not performed, the patch image is printed by outputting the ejection signal Sd to the piezoelectric element 55 in the cycle Cs (time interval) in accordance with the transport speed V while changing the transport speed V by the transport motor 341 (driving part). Then, in Steps S206 to S209, the low speed range Rvl, the medium speed range Rvm, and the high speed range Rvh are determined on the basis of the result of capturing the patch image by using the line scanner 17. It is thereby possible to optimize the low speed range Rvl and the high speed range Rvh in which the ejection timing adjusted printing should not be performed and the medium speed range Rvm in which the ejection timing adjusted printing should be performed.

Figure 11:
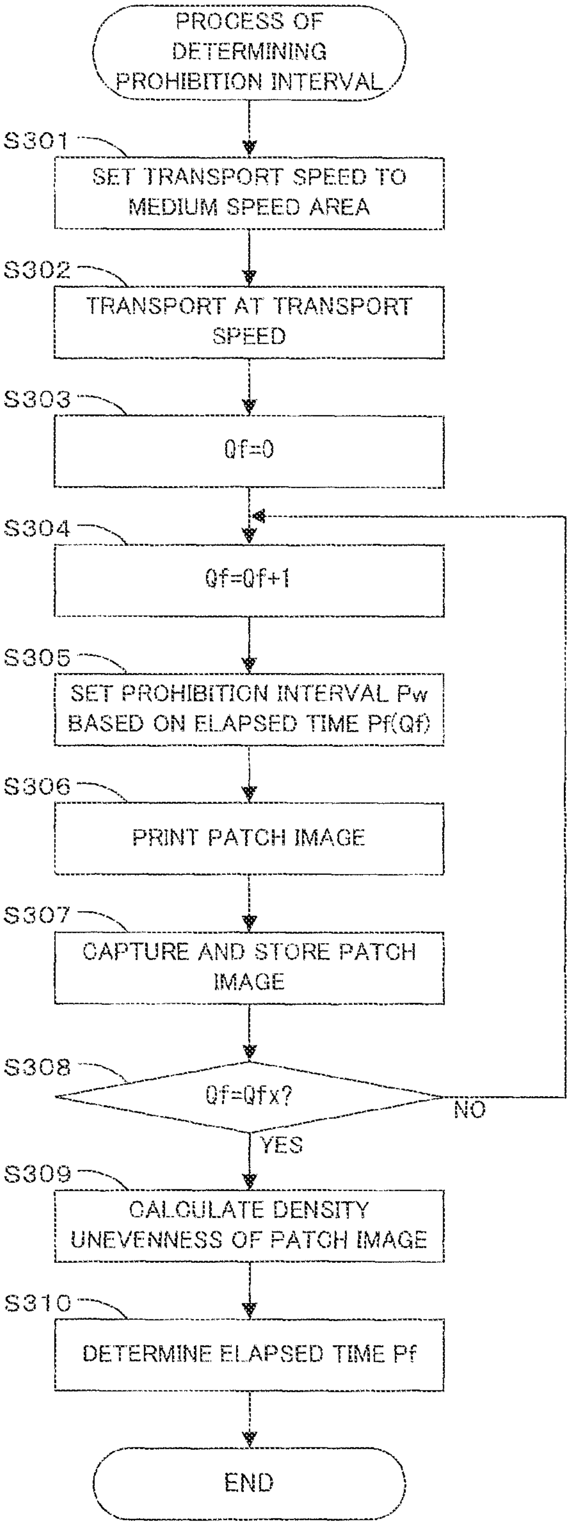
FIG. 11 is a flowchart showing a first example of a process of determining the prohibition interval.

FIG. 11 is a flowchart showing a first example of a process of determining the prohibition interval. In this flowchart, determined is the elapsed time Pf among the parameters for defining the prohibition interval Pw, i.e., the elapsed time Pf and the range ΔPw. In Step S301, the transport speed V is set to be included in the medium speed range Rvm. For example, the transport speed V can be set to the median of the medium speed range Rvm determined in the target speed range determination process of FIG. 10. In Step S302, the printing medium WP is transported at the transport speed V which is thus set.

In Step S303, Qf for distinguishing the elapsed time Pf is reset to zero, and in Step S304, Qf is incremented by 1. In this exemplary case, the elapsed time Pf is longer as the value of Qf is larger. Then, in Step S305, the prohibition interval Pw is set on the basis of this elapsed time Pf (Qf). Further, for setting the prohibition interval Pw, as the range ΔPw, used is a default stored in the storage part 392.

In Step S306, the patch image is printed on the printing medium WP which is transported at the constant transport speed V. In this Step S306, by performing the ejection timing adjusted printing shown in FIGS. 7 and 8, the patch image is printed. Further, like in the case of performing the above-described target speed range determination process, printing of the patch image may be performed by using one ejection head 5.

The patch image which is thus printed on the printing medium WP is moved toward the image capturing position of the line scanner 17 as the printing medium WP is transported. Then, the line scanner 17 acquires a captured image IM (Qf) by capturing the patch image which reaches the image capturing position, and stores the captured image IM (Qf) into the storage part 392 (Step S307).

In Step S308, it is determined whether or not Qf coincides with Qfx. When Qf does not coincide with Qfx ("NO" in Step S308), Qf is incremented by 1 in Step S304 and the elapsed time Pf (Qf) becomes longer by one level. Thus, Steps S305 to S307 are performed on the basis of the elapsed time Pf (Qf) which is thus changed.

Thus, by repeating Steps S305 to S307 while increasing the elapsed time Pf (Qf), acquired are the captured images IM (Qf) of the patch image printed on the printing medium WP while adjusting the output timing Td (I) in accordance with the prohibition interval Pw set on the basis of the elapsed times Pf which are different from one another. Then, it is determined that Qf coincides with Qfx ("YES") in Step S308, the computation part 391 analyzes the captured images IM (Qf) (Steps S309 and S310).

In more detail, in Step S309, calculated is density unevenness of each of a plurality of captured images IM (Qf) (Qf=1, 2, . . . , Qfx) representing the patch images printed on the printing medium WP while adjusting the output timing Td (I) in accordance with the prohibition interval Pw set on the basis of the elapsed times Pf which are different from one another. In Step S310, the elapsed time Pf is determined on the basis of this density unevenness. Specifically, a captured image IM (Qf) having the smallest density unevenness is specified among the plurality of captured images IM (Qf). In a state where the elapsed time Pf is inappropriate and the effect of the residual vibration is not suppressed, the ejection of the ink is not stable and large density unevenness thereby occurs in the printed patch image, and on the other hand, in another state where the elapsed time Pf is appropriate and the effect of the residual vibration is suppressed, the ejection of the ink becomes stable and the density unevenness in the printed patch image is reduced to be smaller. In other words, the captured image IM (Qf) indicating the smallest density unevenness is formed of inks ejected while suppressing the effect of the residual vibration. Therefore, specified is the elapsed time Pf (Qf) used when this captured image IM (Qf) is printed.

In the first example of the prohibition interval determination process, the computation part 391 repeatedly performs the operation of printing the patch image (test image) on the printing medium WP by outputting the ejection signal Sd to the piezoelectric element 55 at the output timing Td (I) determined in the timing determination operation (Steps S103 to S105) while changing the prohibition interval Pw (elapsed time Pf) (Steps S304 to S306). Then, the computation part 391 determines the prohibition interval Pw (elapsed time Pf) on the basis of the result of detecting the patch image by using the line scanner 17 (Steps S307 to S310). It is thereby possible to optimize the prohibition interval Pw (elapsed time Pf) in accordance with the degree of the effect of the residual vibration.

Figure 12:
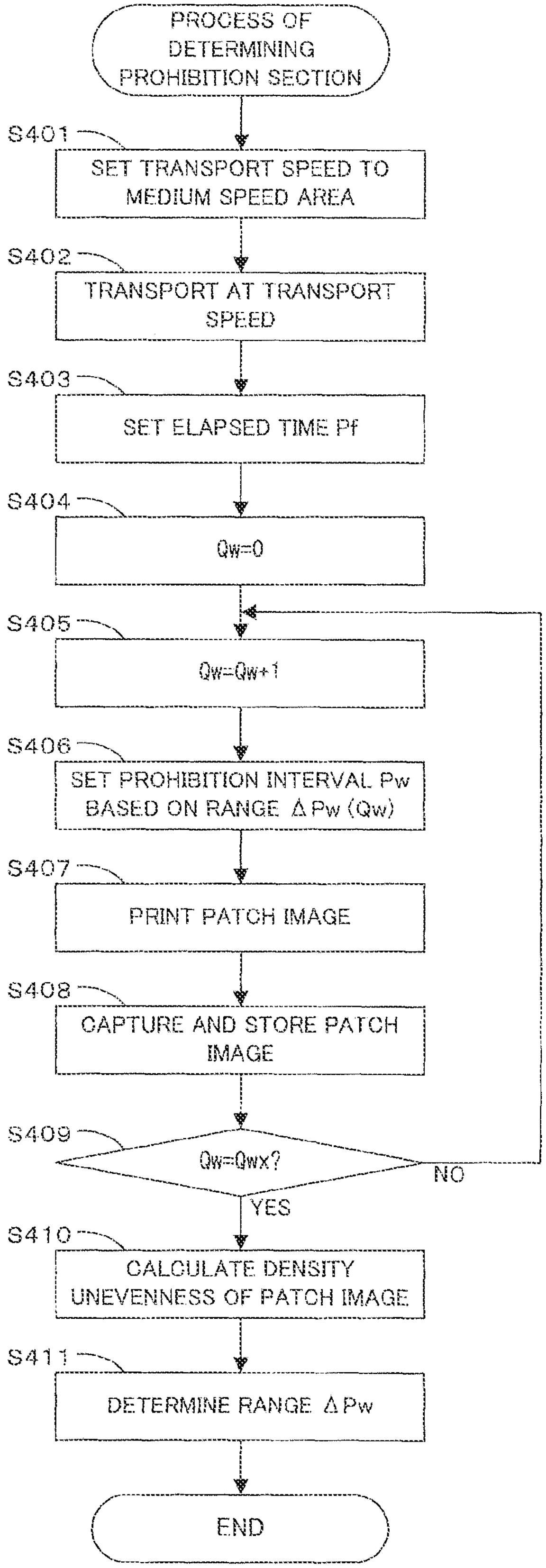
FIG. 12 is a flowchart showing a second example of the process of determining the prohibition interval.

FIG. 12 is a flowchart showing a second example of the process of determining the prohibition interval. In this flowchart, determined is the range ΔPw among the parameters for defining the prohibition interval Pw, i.e., the elapsed time Pf and the range ΔPw. In Step S401, the transport speed V is set to be included in the medium speed range Rvm. For example, the transport speed V can be set to the median of the medium speed range Rvm determined in the target speed range determination process of FIG. 10. In Step S402, the printing medium WP is transported at the transport speed V which is thus set. Further, in Step S403, the elapsed time Pf is set. For example, the value determined in Step S310 of the first example of the prohibition interval determination process of FIG. 11 can be set to the elapsed time Pf.

In Step S404, Qw for distinguishing the range ΔPw is reset to zero, and in Step S405, Qw is incremented by 1. In this exemplary case, the range ΔPw is wider as the value of Qf is larger. Then, in Step S406, the prohibition interval Pw is set on the basis of this range ΔPw (Qw) and the elapsed time Pf in Step S403.

In Step S407, the patch image is printed on the printing medium WP which is transported at the constant transport speed V. In this Step S407, by performing the ejection timing adjusted printing shown in FIGS. 7 and 8, the patch image is printed. Further, like in the case of performing the above-described target speed range determination process, printing of the patch image may be performed by using one ejection head 5.

The patch image which is thus printed on the printing medium WP is moved toward the image capturing position of the line scanner 17 as the printing medium WP is transported. Then, the line scanner 17 acquires a captured image IM (Qw) by capturing the patch image which reaches the image capturing position, and stores the captured image IM (Qw) into the storage part 392 (Step S408).

In this Step S409, it is determined whether or not Qw coincides with Qwx. When Qw does not coincide with Qwx ("NO" in Step S409), Qw is incremented by 1 in Step S405 and the range ΔPw (Qw) becomes longer by one level. Thus, Steps S406 to S408 are performed on the basis of the range ΔPw (Qw) which is thus changed.

Thus, by repeating Steps S406 to S408 while increasing the range ΔPw (Qw), acquired are the captured images IM (Qw) of the patch image printed on the printing medium WP while adjusting the output timings Td (I) in accordance with the prohibition interval Pw set on the basis of the ranges ΔPw which are different from one another. Then, when it is determined that Qw coincides with Qwx ("YES") in Step S409, the computation part 391 analyzes the captured image IM (Qw) (Steps S410 and S411).

In more detail, in Step S410, calculated is density unevenness of each of a plurality of captured images IM (Qw) (Qw=1, 2, . . . , Qwx) representing the patch images printed on the printing medium WP while adjusting the output timing Td (I) in accordance with the prohibition interval Pw set on the basis of the ranges ΔPw which are different from one another. In Step S411, the range ΔPw is determined on the basis of this density unevenness. Specifically, a captured image IM (Qw) having the smallest density unevenness is specified among the plurality of captured images IM (Qw). In a state where the range ΔPw is inappropriate and the effect of the residual vibration is not suppressed, the ejection of the ink is not stable and large density unevenness thereby occurs in the printed patch image, and on the other hand, in another state where the range ΔPw is appropriate and the effect of the residual vibration is suppressed, the ejection of the ink becomes stable and the density unevenness in the printed patch image is reduced to be smaller. In other words, the captured image IM (Qw) indicating the smallest density unevenness is formed of inks ejected while suppressing the effect of the residual vibration. Therefore, specified is the range ΔPw used when this captured image IM (Qw) is printed.

In the second example of the prohibition interval determination process, the computation part 391 repeatedly performs the operation of printing the patch image (test image) on the printing medium WP by outputting the ejection signal Sd to the piezoelectric element 55 at the output timing Td (I) determined in the timing determination operation (Steps S103 to S105) while changing the prohibition interval Pw (range ΔPw) (Steps S405 to S407). Then, the computation part 391 determines the prohibition interval Pw (range ΔPw) on the basis of the result of detecting the patch image by using the line scanner 17 (Steps S408 to S411). It is thereby possible to optimize the prohibition interval Pw (range ΔPw) in accordance with the degree of the effect of the residual vibration.

As described above, the printer 3 corresponds to one example of a "printer" of the present invention, the driving roller 7, the plurality of transport rollers 9, and the driving roller 11 correspond to one example of a "driving part" of the present invention, the line scanner 17 corresponds to one example of a "detection part" of the present invention, the control part 39 corresponds to one example of a "control part" and a "computer" of the present invention, the printing program 393 corresponds to one example of a "printing program" of the present invention, the recording medium 399 corresponds to one example of a "recording medium" of the present invention, the ejection head 5 corresponds to one example of an "ejection head" of the present invention, the nozzle 52 corresponds to one example of a "nozzle" of the present invention, the cavity 53 corresponds to one example of a "pressure chamber" of the present invention, the piezoelectric element 55 corresponds to one example of a "driving element" of the present invention, the ejection signal Sd corresponds to one example of an "ejection signal" of the present invention, the candidate timing Tc (I) corresponds to one example of a "candidate timing" of the present invention, the output timing Td (I) corresponds to one example of an "output timing" of the present invention, the prohibition interval Pw corresponds to one example of a "prohibition interval" of the present invention, the elapsed time Pf corresponds to one example of a "predetermined time" of the present invention, the range ΔPw corresponds to one example of a "predetermined range" of the present invention, and Steps S103 to 105 correspond to one example of a "timing determination operation" of the present invention.

Further, the present invention is not limited to the above-described embodiment, but numerous modifications and variations other than those described above can be devised without departing from the scope of the invention. For example, the method of ejecting ink is not limited to the above-described method using the piezoelectric element 55.

Furthermore, a specific mechanism for moving the printing medium WP relatively to the ejection head 5 is not limited to the above-described example. Specifically, the ejection head 5 may be moved by using a carriage, instead of transporting the printing medium WP by using the driving roller 7, the plurality of transport rollers 9, and the driving roller 11.

Further, the above-described printing of the patch image is performed by using one ejection head 5. The printing of the patch image, however, may be performed by using a plurality of ejection heads 5.

Furthermore, it is not essential to perform the target speed range determination process and the first and second examples of the prohibition interval determination process shown in FIGS. 10, 11, and 12, but the conditions for performing the ejection timing adjusted printing may be determined by any other method.

Further, in a case where the effect of the residual vibration occurs all over the variable ranges of the transport speed V of the printing medium WP, the ejection timing adjusted printing shown in FIGS. 7 and 8 may be always performed, regardless of the speed range.

Furthermore, though the material of the above-described printing medium WP is continuous form paper, the material is not limited to the above one but may be sheet form paper. Further, the material of the printing medium is not always limited to paper but may be, for example, a film such as OPP (oriented polypropylene), PET (polyethylene terephthalate), or the like.

The present invention can be applied to a general inkjet technology in which ink is ejected from a nozzle communicating with a pressure chamber by giving pressure variation to the ink stored in the pressure chamber.

As described above, the printer may be configured so that the control part determines a timing which is delayed step by step by the unit time from the I-th candidate timing and first gets out of the prohibition interval, as the I-th output timing, assuming that a value obtained by dividing the time interval between the (I−1)th candidate timing and the I-th candidate timing by K is regarded as a unit time, K being an integer not smaller than 2. In such a configuration, by an easy and convenient computation in which the timing is shifted by the unit time, it is possible to determine the output timings to the timings where the effect of the residual vibration is suppressed.

Furthermore, the prohibition interval may be obtained theoretically or experimentally. In the latter case, for example, the following configuration may be formed. That is, A printer according may further comprises: a detection part detecting ink landed on the printing medium, wherein the control part repeatedly performs an operation of outputting the ejection signal to the driving element at the output timing determined in the timing determination operation and printing a test image on the printing medium while changing the prohibition interval and determines the prohibition interval on the basis of a result of detecting the test image by the detection part. It is thereby possible to optimize the prohibition interval in accordance with the degree of the effect of the residual vibration.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printer, comprising:

an ejection head having a pressure chamber storing ink therein, a nozzle communicating with the pressure chamber, and a driving element giving pressure variation to the ink inside the pressure chamber;

a driving part configured to move a printing medium facing the nozzle relatively to the ejection head; and a control part configured to determine N output timings from a first output timing to an N-th output timing which are arranged in chronological order and outputs an ejection signal to the driving element at each of the N output timings, N being an integer not smaller than 2, wherein the driving element gives the pressure variation to the ink inside the pressure chamber in response to the ejection signal received from the control part, to thereby eject the ink from the nozzle, the control part performs a timing determination operation in which N candidate timings from a first candidate timing to an N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

2. The printer according to claim 1, wherein assuming that a value obtained by dividing the time interval between the (I−1)th candidate timing and the I-th candidate timing by K is regarded as a unit time, K being an integer not smaller than 2, the control part determines a timing which is delayed step by step by the unit time from the I-th candidate timing and first gets out of the prohibition interval, as the I-th output timing.

3. The printer according to claim 1, further comprising:

a detection part detecting ink landed on the printing medium, wherein the control part repeatedly performs an operation of outputting the ejection signal to the driving element at the output timing determined in the timing determination operation and printing a test image on the printing medium while changing the prohibition interval and determines the prohibition interval on the basis of a result of detecting the test image by the detection part.

4. A printing method of ejecting ink to a printing medium from a nozzle of an ejection head having a pressure chamber storing ink therein, the nozzle communicating with the pressure chamber, and a driving element giving pressure variation to the ink inside the pressure chamber, comprising:

determining N output timings from the first output timing to the N-th output timing which are arranged in chronological order, N being an integer not smaller than 2; and ejecting ink from the nozzle by outputting an ejection signal to the driving element at each of the N output timings so that the driving element gives pressure variation to the ink inside the pressure chamber in response to the ejection signal, while moving a printing medium facing the nozzle relatively to the ejection head, wherein in determining the output timings, performed is a timing determination operation in which N candidate timings from the first candidate timing to the N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

5. A recording medium recording a printing program in a computer-readable manner, the printing program causing a computer to control ejection of ink to a printing medium from a nozzle of an ejection head having a pressure chamber storing ink therein, the nozzle communicating with the pressure chamber, and a driving element giving pressure variation to the ink inside the pressure chamber, and causing the computer to perform:

determining N output timings from the first output timing to the N-th output timing which are arranged in chronological order, N being an integer not smaller than 2; and ejecting ink from the nozzle by outputting an ejection signal to the driving element at each of the N output timings so that the driving element gives pressure variation to the ink inside the pressure chamber in response to the ejection signal, while moving a printing medium facing the nozzle relatively to the ejection head, wherein in determining the output timings, performed is a timing determination operation in which N candidate timings from the first candidate timing to the N-th candidate timing which are arranged in chronological order at a time interval in accordance with a relative speed of the printing medium to the ejection head are set and the N output timings are determined on the basis of a prohibition interval provided to a predetermined range at which a predetermined time elapsed from a starting point timing and the N candidate timings, the first candidate timing among the N candidate timings is set as the first output timing among the N output timings, and in the timing determination operation, when the I-th candidate timing is set outside the prohibition interval whose starting point timing is the (I−1)-th output timing, the I-th candidate timing is determined as the I-th output timing, and on the other hand, when the I-th candidate timing is set inside the prohibition interval whose starting point timing is the (I−1)-th output timing, a computation to determine that a timing after the prohibition interval is the I-th output timing is performed for the second and later candidate timings in chronological order, I being an integer not smaller than 2 and not larger than N.

* * * * *